N. H. SMITH.
Stave Sawing-Machines.
No. 152,698. Patented June 30, 1874.
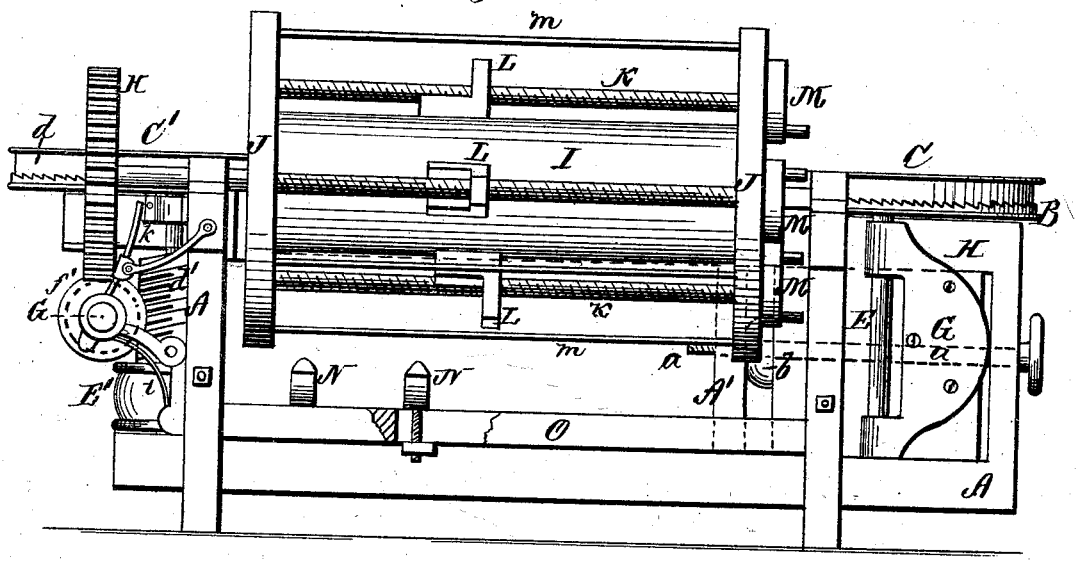
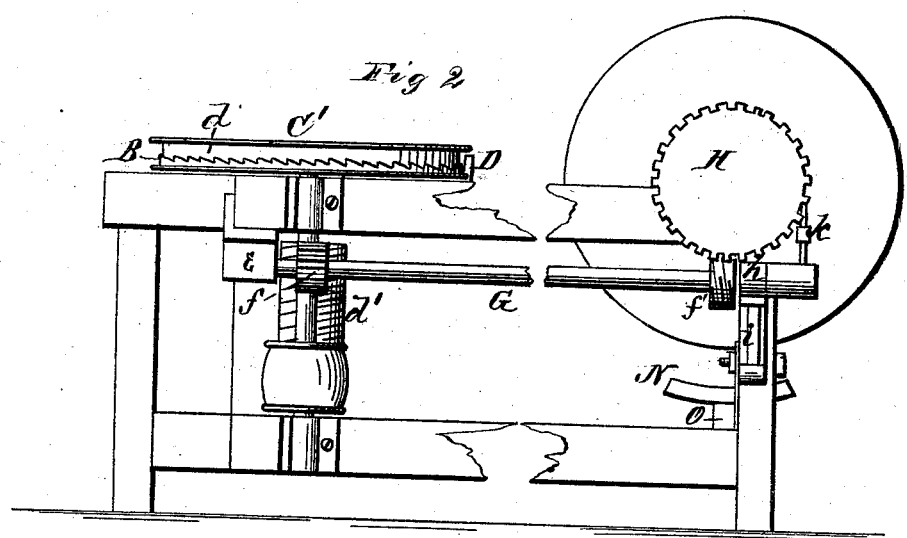

2 Sheets--Sheet 2.
N. H. SMITH.
Stave Sawing-Machines.
No. 152,698. Patented June 30, 1874.
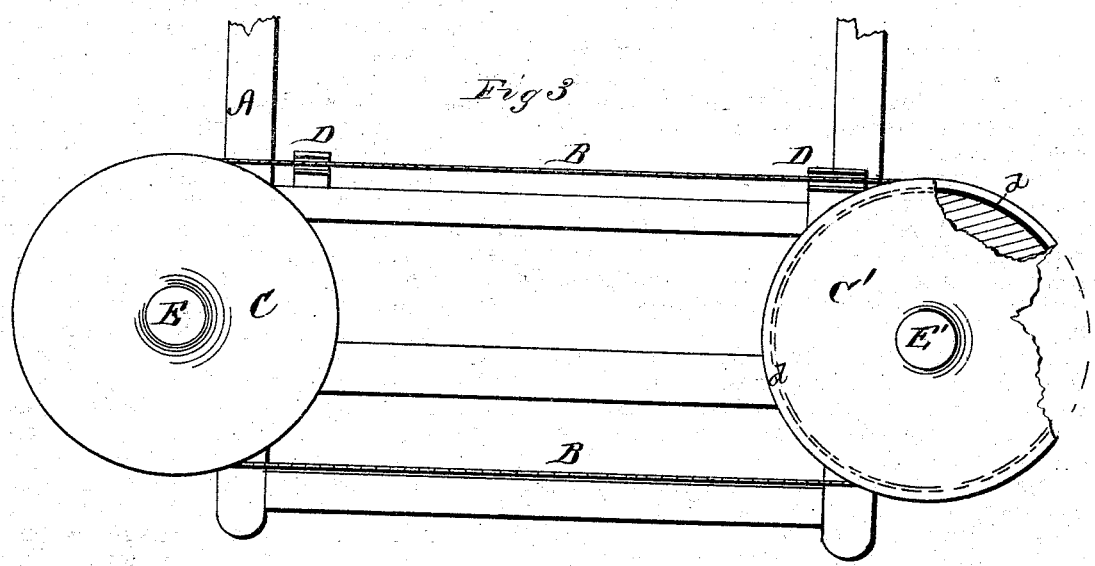
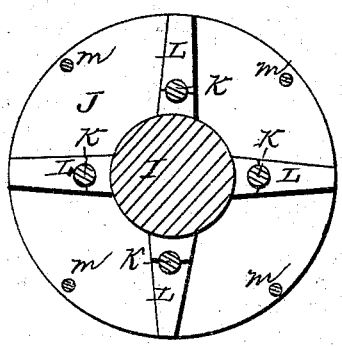
WITNESSES.
INVENTOR
Newton H. Smith,
By
Alexander _____
Attorneys.

UNITED STATES PATENT OFFICE.

NEWTON H. SMITH, OF BONAPARTE, IOWA.

IMPROVEMENT IN STAVE-SAWING MACHINES.

Specification forming part of Letters Patent No. 152,698, dated June 30, 1874; application filed April 4, 1874.

*To all whom it may concern:*

Be it known that I, NEWTON H. SMITH, of Bonaparte, in the county of Van Buren and in the State of Iowa, have invented certain new and useful Improvements in Stave-Sawing Machines; and do hereby declare that the following is a full, clear, and exact description thereof, reference being had to the accompanying drawings, and to the letters of reference marked thereon, making a part of this specification.

The nature of my invention consists in the construction and arrangement of a machine for sawing staves, embodying a revolving carriage for holding the timber, and an endless-band saw, cutting horizontally or lengthwise with the timber, as will be hereinafter more fully set forth.

In order to enable others skilled in the art to which my invention appertains to make and use the same, I will now proceed to describe its construction and operation, referring to the annexed drawings, in which—

Figure 1 is a side elevation, and Fig. 2 an end view, of my machine. Fig. 3 is a plan view of a part of the same.

A represents the frame of my machine, constructed in any suitable manner to contain the various working parts. B represents the saw, which is an endless-band saw, placed upon two horizontal pulleys, C and C', and passing through guards D D on the side where the cutting is done. The guards D D prevent the saw being pressed down, and prevent bark or timber passing between the pulleys and the saw, and they hold the saw in an upright position. E E' represent the shafts or spindles, respectively, of the pulleys C C'. The shaft E has its bearings in a casting, G, which is secured to a slide, H, and this slide is moved horizontally back and forth by means of a screw-shaft, $a$, having a hand-wheel at its outer end, for the purpose of keeping the saw tight. The inner end of the screw $a$ passes through a nut embedded in a post, A', of the main frame, and between this post and the slide H is placed a rubber spring, $b$, on the screw-shaft. This spring $b$, in connection with rubber gaskets $d$, placed around the pulley C', between it and the saw, equalizes the tension of the saw. The power is attached to the shaft E' by means of a belt at the base thereof. The feed for the carriage is also attached to this shaft by means of a worm-wheel, $d'$, on the shaft E', gearing with a worm, $f$, on a shaft, G. This end of the shaft G has a stationary bearing at $e$, while the other end has its bearings in a hinged arm, $h$, which is held up by means of a spring, $i$, so that a worm, $f'$, on this end of the shaft will gear with a worm-wheel, H, upon the end of the carriage-shaft or journal. To the same end of the feed-shaft G is connected a compound lever, $k$, by which the worm $f'$ may be depressed and removed from the wheel H, to throw the carriage out of gear. The carriage is composed of a cylinder, I, either solid or hollow, provided with a central shaft or journals having bearings on the main frame, in which the carriage revolves. At each end of the cylinder I is an enlarged head, J, and through these heads, the entire length of the cylinder, pass screws K K, upon which are placed the clamps L L for holding the timber. At one end of the carriage is a hand-wheel, M, upon the end of each screw K, by means of which the location of the clamps is changed, suiting them to a long or short piece of timber. The heads J J are connected, near their outer edges, by means of rods $m$ $m$, which act as stays to the heads when tightening the clamps, and to keep the timber in place when loosened from the clamps and lying on the rests beneath; and also serve as a rest for the timber when being placed on the carriage.

When the stave is cut, the revolution of the carriage brings the timber over the rests N N beneath, which rests are adjustable horizontally on a bar, O, and this bar adjustable vertically on the main frame, so as to suit the length of the timber, or the thickness of the stave to be cut.

The staves, as they are cut, are intended to be carried out, by means of an endless belt, upon rollers underneath the saw, which belt will be run by a belt wheel or pulley from the band-shaft. At the same time that the saw is cutting one stave the clamps on the lower timber should be loosened, which timber then adjusts itself by dropping or falling on the rests N N, when the clamps are again fastened by the hand-wheel M at the end of the screw.

The time for placing the timber on the carriage is when the clamps are immediately in front of the operator.

By increasing the circumference of the carriage any given number of pieces of timber can be placed upon it. The circle on the stave is increased by moving the carriage from the saw.

I am aware that a stave-sawing machine, provided with a revolving carriage having self-acting dogging mechanism for holding the bolts, and segmental guides for gaging the thickness of the staves, has been known; hence I disclaim such as being, broadly, my invention.

Having thus fully described my invention, what I claim as new, and desire to secure by Letters Patent, is—

1. The combination, in a stave-sawing machine having an endless or band saw, B, passing around two horizontal pulleys, C C', provided with rubber gasket d, of the spindle E, bearing G, slide H, screw-shaft a, and rubber spring b, all constructed and arranged as and for the purposes herein set forth.

2. The combination, with the feed-shaft G, of the hinged arm h, spring i, and compound lever k, for the purposes herein set forth.

3. The combination of the revolving carriage I J, rods m m, screws K K, with hand-wheels M M and clamps L L, all constructed as and for the purposes herein set forth.

4. The horizontally and vertically adjustable rests N N, arranged under the revolving carriage I J, substantially as and for the purposes herein set forth.

In testimony that I claim the foregoing I have hereunto set my hand this 24th day of February, 1874.

NEWTON H. SMITH.

Witnesses:
HENRY DETWILER,
AUGUSTUS WHITLOCK.